United States Patent [19]

Perrins et al.

[11] Patent Number: 5,470,887
[45] Date of Patent: Nov. 28, 1995

[54] VESICULATED POLYMER BEADS

[75] Inventors: Neil Perrins, High Wycombe; Mary E. Kelly, Slough, both of Great Britain

[73] Assignee: Imperial Chemical Industries, PLC, United Kingdom

[21] Appl. No.: 232,643

[22] Filed: Apr. 25, 1994

[30] Foreign Application Priority Data

Apr. 29, 1993 [GB] United Kingdom ............... 9308895

[51] Int. Cl.[6] ............................................. C08F 8/00
[52] U.S. Cl. ................... 521/65; 525/27; 525/45; 525/47; 525/48; 525/49; 525/387; 526/228; 526/230.5
[58] Field of Search ............... 525/387, 27, 45, 525/47, 48, 49; 526/228, 230.5; 521/65

[56] References Cited

U.S. PATENT DOCUMENTS

| | | | |
|---|---|---|---|
| 4,314,033 | 2/1982 | Gillan et al. | 521/65 |
| 4,321,332 | 3/1982 | Beresford et al. | 525/19 |
| 4,808,633 | 2/1989 | Ferguson et al. | 521/63 |

FOREIGN PATENT DOCUMENTS

| | | |
|---|---|---|
| 0003957 | 9/1979 | European Pat. Off. . |
| 52-24294 | 2/1977 | Japan . |
| 55-133404 | 10/1980 | Japan . |
| 2075523 | 12/1981 | United Kingdom . |
| WO81/01711 | 6/1981 | WIPO . |

*Primary Examiner*—Bernard Lipman
*Attorney, Agent, or Firm*—Thomas M. Schmitz

[57] ABSTRACT

Vesiculated polymer beads are prepared in which a water-in-oil-in-water emulsion containing a cross-linkable polymer and a copolymerizable monomer in the oil phase is heated in the presence of an initiator to cure the polymer beads, wherein curing is commenced in a first stage in the presence of a substantially water-insoluble initiator and, when the beads are sufficiently stable, curing is completed in a second stage in the presence of an at least partially water-soluble initiator. Preferably, the completion of curing is carried out at a temperature higher than that of the first stage. The beads can be used in low odor paint formulations.

12 Claims, No Drawings

VESICULATED POLYMER BEADS

This invention relates to vesiculated polymer beads and more particularly to multi-vesiculated polymer beads for use in coating compositions.

The preparation of vesiculated polymer beads (granules) useful as opacifiers in coating compositions is the subject of an extensive technical and patent literature. In multi-vesiculated beads the structure of individual beads consists of a solid polymer matrix, formed usually from a crosslinked polymer, in which are incorporated numerous vesicles of an aqueous phase. A variety of polymer systems may be used to form such beaded structures, the one most commonly used commercially being that derived from polyester resins having a proportion of ethylenically unsaturated linkages which provide sites for cross-linking with a suitable copolymerisable unsaturated monomer.

The basic process for the production of beaded structures of the above kind is well-known, having been described, for example, in International publication WO 81/01711. In outline, the process begins with the formation of a first emulsion in which an aqueous phase is emulsified in a mixture of the unsaturated polyester and the selected copolymerisable monomer, usually as a solution of the polyester in a liquid monomer. The resulting water-in-oil emulsion is hereinafter referred to as EM1. Where pigmented beads are desired it is convenient to disperse the pigment in the aqueous phase before forming the EM1 emulsion. The EM1 emulsion is then itself emulsified at high shear into an aqueous phase to form a water-in-oil-in water emulsion in which the dispersed oil phase consists of globules of polyester/monomer of the desired size each containing numerous vesicles of the initial aqueous phase. To the resulting double emulsion, hereinafter referred to as EM2, a polymerising initiator typically of the free radical type is then added and the mixture subjected to curing conditions to cross-link the polyester and thereby fix or "freeze" the polymer in beaded form.

The process conditions necessary for the production of satisfactory vesiculated polymer beads according to the basic process have been indicated in WO 81/01711, GB 2,075,523, GB 1,491,011 and in other prior patents. Thus the types of polymer/copolymerisable monomer system which may be successfully utilised are now well established. It is also known that the acid value of the selected polyester should be within certain limits eg 5–50 mg KOH/g and that the process should be carried out in the presence of a suitable base, eg an alkaline earth metal hydroxide which may be used in the oil phase (polyester solution), aqueous phase, or both. The emulsifying agents, stabilisers, thickeners and other reagents required for the various stages of the basic process have also been disclosed in WO 81/01711 and elsewhere. The present invention provides a modification of the basic process and, as such, it generally follows the essential parameters of the latter; these are well known to the skilled worker and therefore do not require detailed repetition in the present application.

Coating compositions based on vesiculated polymer beads produced as described above have proved commercially highly successful for many applications. However, a disadvantage of current processes of production is that the beads are unacceptable in low odour paint formulations because they do not meet low odour specifications. The odour of the currently produced beads arises from various causes. One is that residues of the hydrocarbon solvents used in the manufacture of the initial polyester are not eliminated in the process and remain in the final product. A more significant contribution to odour derives from the most commonly used polymerisation initiator, namely, cumene hydroperoxide which produces cumene as by-product. Another source of undesirable odour is the unreacted copolymerisable monomer which remains in the product. Styrene, the currently preferred monomer, is particularly objectionable in this respect at the levels which obtain in products of the current process of manufacture.

One attempt to solve the problem of unreacted styrene is disclosed in GB-A 2,075,523 according to which the EM2 emulsion is heated to at least 45° C. prior to the addition of the initiator. This preparatory heating step is said to reduce the proportion of unreacted monomer to below 1.5% by weight of the weight of the total polymer in the case of styrene. However, this degree of reduction is insufficient to meet the standard required in low odour paints.

It has now been found that levels of unreacted styrene or other monomer may be reduced substantially by employing different types of initiator at different stages of the process.

Accordingly one aspect of the present invention comprises a process of producing vesiculated cross-linked polymer beads in which a water-in-oil-in-water emulsion containing a cross-linkable polymer and a copolymerisable monomer in the oil phase is heated in the presence of an initiator to cure the beads characterised in that curing is commenced in a first stage by a substantially water-insoluble initiator and, when the beads are sufficiently stable, curing is completed in a second stage in the presence of an at least partially water-soluble initiator. Preferably, the second stage of curing is carried out at a temperature higher than that of the first stage.

In carrying out the process of the present invention an aqueous phase, usually containing a pigment, eg titanium dioxide, a dispersant therefor and an antifoam agent, is added at high shear to a solution of the polymer in liquid copolymerisable monomer to produce the EM1 emulsion. Where a partially unsaturated polyester resin is used it is preferred that this is one produced by polycondensation of dihydric alcohols and the appropriate mixture of saturated and unsaturated carboxylic acids in the absence of any odour-bearing solvent which, persisting at a residual level in the polymer, may contribute an undesirable odour to the final beaded polymeric product. The use of a fusion polyester is therefore highly preferred. It is customary to neutralise terminal carboxyl groups of the polyester with a suitable base such as one described in WO 81/01711. Conveniently the base may be dispersed in the oil phase prior to forming the EM1 emulsion. In accordance with this invention substantially water-insoluble initiator is added to the EM1 emulsion and dissolved therein. Typically, the initiator is present in the reaction medium at a low level. Best results are achieved with a level of at least 0.1%, preferably 0.3% and even more preferably 0.5% by weight of the total oil phase. Apart from efficiency as an initiator of polymerisation an important factor in the choice of initiator is that it will not contain or generate unacceptably odoriferous by-products or break-down products. Peresters, especially peresters of alkylated substantially odourless aromatic acids, are suitable initiators and tertiary butyl perbenzoate in particular fulfils these requirements admirably. The initiator is added together with a suitable promoter/accelerator system, for example diethylene triamine and ferrous sulphate.

The EM1 emulsion containing the added specified materials is then emulsified in an aqueous solution containing an emulsifying agent and a thickening agent at high shear to form the EM2 emulsion.

The resulting EM2 emulsion, after being allowed to stand at room temperature, is then subjected to a first stage cure by heating and maintaining the emulsion at an elevated temperature, usually at 55° C. or more, for a further period usually not less than one hour during which crosslinking of the polymer proceeds to the stage of formation of partially cured polymer beads. This stage may be concluded when the beads are of a sufficiently stable structure for further processing in a second stage cure. Further processing will involve the addition to the beads with stirring of the second stage initiator. The desired period of duration of the first stage is readily determined by experiment with the selected polymer/monomer combination.

The second stage of curing commences with the addition of an at least partially water-soluble polymerisation initiator to the product of the first stage. Best results are obtained when the initiator is added to the water phase in an amount sufficient to provide at least 0.1%, preferably 0.3% and even more preferably 0.5% by weight of the total oil phase. The additional criteria for selection of suitable second stage initiators are the same as those for the first stage initiator. Peracids or peroxides, especially alkyl hydroperoxides, are suitable initiators for the second stage and tertiary butyl hydroperoxide has proved to be exceptionally suitable for this stage of curing. After addition of the water-soluble initiator the temperature of the emulsion is raised. In general, the greater the temperature at this stage the lower is the level of free monomer in the final product. However, temperatures of up to 75° C. have been found to be sufficient to provide acceptable levels of free monomer in the final product. A period of at least three hours is usually required for the second stage cure.

Another aspect of the present invention comprises vesiculated cross-linked polymer beads obtainable by a process in which a water-in-oil-in-water emulsion containing the polymer and a copolymerisable monomer in the oil phase is heated in the presence of an initiator to cure the polymer beads wherein curing is commenced in a first stage by a substantially water-insoluble initiator and, when the beads are sufficiently stable, curing is completed in a second stage in the presence of an at least partially water-soluble initiator.

The process of the present invention has been found to produce vesiculated beads containing significantly less unreacted styrene or other monomer than those obtained by processes described in the prior art and those currently used commercially. For example residual levels of styrene of less than 0.4% by weight in the finally cured beads have been regularly achieved.

Yet another aspect of the present invention accordingly comprises vesiculated cross-linked polymer beads having a residual level of unreacted monomer of less than 0.4% by weight.

The aqueous slurry of vesiculated polyester beads thus formed may be used directly in an aqueous latex paint, or it may be dewatered by means known in the art and subsequently redispersed in an aqueous or non-aqueous medium. Paints incorporating the beads prepared by the process of the present invention meet the low odour standard required. A further aspect of the present invention comprises, therefore, a coating composition comprising vesiculated beads produced by the process described herein and a suitable vehicle.

The invention is further illustrated by the following examples:

EXAMPLE 1

Preparations of pigmented, vesiculated polyester resin beads using the following materials and quantities:

|   |   | Parts by weight |
|---|---|---|
| A | water | 71.20 |
|   | surfactant[1] | 2.80 |
|   | antifoam[2] | 0.14 |
| B | titanium dioxide pigment (RHD-2 ex Tioxide UK) | 98.20 |
| C | water | 20.00 |
| D | polyester resin[3] | 80.40 |
|   | styrene | 44.60 |
|   | magnesium oxide | 0.44 |
| E | tertiary butyl perbenzoate | 1.00 |
| F | hydroxy ethyl cellulose solution[4] | 79.90 |
|   | poly (vinyl alcohol) solution[5] | 46.60 |
|   | water | 302.20 |
| G | water | 225.60 |
| H | diethylene triamine | 0.50 |
|   | ferrous sulphate | 0.03 |
| I | tertiary butyl hydroperoxide | 1.00 |
|   | ferrous sulphate | 0.03 |

[1]Fenopon CO436 (ex. Rhone Poulenc)
[2]Foamaster E75C (ex Henkel)
[3]A 65% weight solids solution of 2.57/1/4.23 (molar) maleic anhydride/ phthalic anhydride/propylene glycol polyester in styrene made by a fusion process and avoiding the use of volatile solvents.
[4]A 1.5% weight solids solution of "Natrosol"* 250HR (ex Hercules) was used.
[5]A 7.5% weight solids aqueous solution of "Poval"* 224G (ex Kuraray Rayon) was used.
*Trade Mark The materials A were mixed and the pigment B added to A with stirring. Stirring was continued at high speed until the pigment was completely dispersed and the water C was then added to give a millbase.

The materials D were mixed until the magnesium oxide was completely dispersed. Material E was then added to material D until it was completely dispersed.

The millbase was added to this dispersion and similarly emulsified into it until the dispersed particles of aqueous millbase were about 1 μm in diameter. This is the first emulsion EM1.

The materials F were blended together and the first emulsion EM1 added to it with high speed stirring, the stirring being continued until the globules of the first emulsion were less than 25 μm in diameter. The water G was added to this second or "double" emulsion EM2 and the diethylene triamine and ferrous sulphate H were then added with sufficient stirring to incorporate them. Stirring was discontinued, and the EM2 emulsion was allowed to cure for hour at 55° C.

The materials I were added to the mixture with sufficient stirring to incorporate them fully. Stirring was discontinued and the mixture allowed to cure for 3 hours at 70° C.

If required a bactericide may be added at this point, or the pH of the mixture may be adjusted using sodium hydroxide solution.

The final product was 23.9% weight solids slurry of crosslinked polyester resin granules of 25 μm maximum diameter.

|   |   | Parts by weight |
|---|---|---|
| A | water | 71.20 |
|   | surfactant[1] | 2.80 |
|   | antifoam[2] | 0.14 |
| B | titanium dioxide pigment | 98.20 |

-continued

|   |   | Parts by weight |
|---|---|---|
|   | (RHD-2 ex Tioxide UK) |   |
| C | water | 20.00 |
| D | polyester resin[3] | 80.40 |
|   | styrene | 44.60 |
|   | magnesium oxide | 0.44 |
| E | hydroxy ethyl cellulose solution[4] | 79.90 |
|   | poly (vinyl alcohol) solution[5] | 44.60 |
|   | water | 302.20 |
| F | water | 225.60 |
| G | cumene hydroperoxide[6] | 1.30 |
|   | diethylene triamine | 0.50 |
|   | ferrous sulphate | 0.03 |

[1]Fenopan CO436 (ex Rhone Poulenc)
[2]Foamaster E75C (ex. Henkel)
[3]A 65% weight solids solution of 2.57/1/4.23 (molar) maleic anhydride/phthalic anhydride/propylene glycol polyester in styrene made by conventional condensation polymerisation using xylene as an azeotroping solvent.
[4]A 1.5% weight solids solution of "Natrosol"* 250HR (ex Hercules) was used.
[5]A 7.5% weight solids aqueous solution of "Poval"* 224G (ex Kuraray Rayon) was used.
[6]Commercially available 90% weight active ingredients was used.
*Trade Mark The materials A were mixed and the pigment B added to A with stirring. Stirring was continued at high speed until the pigment was completely dispersed and the water C was then added to give a millbase.

The materials D were mixed until the magnesium oxide was completely dispersed. The millbase was added to this dispersion and similarly emulsified into it until the dispersed particles of millbase were about 1 μm in diameter. This is the first emulsion EM1.

The materials E were blended together and the first emulsion EM1 added to it with high speed stirring, the stirring being continued until the globules of the first emulsion were less than 25 μm in diameter. The water F was added to this "double" emulsion EM2, and the cumene hydroperoxide, diethylene triamine and ferrous sulphate of G were then added with sufficient stirring to incorporate them. Stirring was discontinued and the mixture allowed to cure for 3 hours at 55° C.

If required, a bactericide may be added at this point, or the pH of the mixture may be adjusted using ammonia solution.

The final product was a 23.9% weight solids slurry of crosslinked polyester resin granules of 25 μm maximum diameter.

EXAMPLE 3

Demonstration of the effect of the addition of a diethylene triamine to the aqueous initiator system.

Example 1 was repeated except that diethylene triamine was added with the materials I. The amount of diethylene triamine added was 0.5 parts by weight.

EXAMPLE 4

Demonstration of the effect of lowering the final curing temperature.

Example 3 was repeated except that the final curing temperature was 60° C.

EXAMPLE 5

Demonstration of the use of different initiator system combinations.

Example 1 was repeated except that ferrous sulphate in the materials I was replaced by sodium metabisulphite. The amount of sodium metabisulphite added was 0.5 parts by weight. Additionally the level of tertiary butyl hydroperoxide was reduced to 0.5 parts by weight.

TABLE 1

| Free Styrene Measurements (% by weight of the weight of the total polymer) | |
|---|---|
| Example 1 | 0.17 |
| Example 2 | 3.13 |
| Example 3 | <0.08 |
| Example 4 | 0.22 |
| Example 5 | 0.31 |

The Table shows that the amount of free styrene in Example 2 is significantly higher than the amount of free styrene in Examples 1 and 3 to 5. The level of free styrene produced in Example 2 was unacceptable from the point of view of odour whereas the amount of free styrene produced in the other Examples produced either no detectable odour (Example 3) or acceptable levels of odour.

What is claimed is:

1. In a process for producing vesiculated polymer beads in which a water-in-oil emulsion containing a crosslinkable polymer and a copolymerisable monomer in the oil phase is heated in the presence of an initiator to cure the polymer beads, the improvement in the process comprising:

crosslinking the polymer and the copolymerisable monomer by addition copolymerization, where the polymer is a partially ethylenically unsaturated polyester resin and the monomer is unsaturated monomer, by (a) commencing curing in a first stage by a substantially water insoluble perester initiator and, when the beads are sufficiently stable, (b) completing the curing in a second stage in the presence of at a partially water soluble initiator selected from a peroxide or a peracid, and at a temperature higher than the first stage curing.

2. A process according to claim 1, in which the water-insoluble initiator is a perester of an alkylated substantially odourless aromatic acid.

3. A process according to claim 2, in which the water-insoluble initiator is tert-butyl perbenzoate.

4. A process according to claim 1, in which the water-soluble initiator is an alkyl hydroperoxide.

5. A process according to claim 4, in which the water-soluble initiator is tert-butyl hydroperoxide.

6. A process according to claim 1, in which the water-insoluble and water-soluble initiators are added to the respective oil and continuous water phases, respectively, in amounts sufficient to provide at least 0.1% by weight on the total weight of the oil phase.

7. A process according to claim 6, in which the water-insoluble and water-soluble initiators are added to the oil and continuous water phases, respectively, in amounts sufficient to provide from 0.3 to 0.5% by weight on the total weight of the oil phase.

8. A process according to claim 1, in which the first stage of curing is carried out at temperatures of up to about 60° C.

9. A process according to claim 8, in which the second stage of curing is carried out at a temperature of about 65°–75° C.

10. A process according to claim 1, in which the polymer has been produced by a fusion process.

11. A process according to claim 1, in which the monomer is styrene.

12. A process according to claim 1, in which the polymer is a partially ethylenically unsaturated polyester resin, the monomer is an ethylenically unsaturated monomer, the substantially water-insoluble initiator is a perester of an alkylated substantially odourless aromatic acid, the at least partially water-soluble initiator is an alkyl hydrogen peroxide, and the completion of curing is carried out at a temperature higher than that of the first stage.

* * * * *